Nov. 1, 1938.　　　J. L. SALERNO　　　2,134,931
AUTOMATIC HITCH AND BRAKE MECHANISM
Filed April 5, 1937
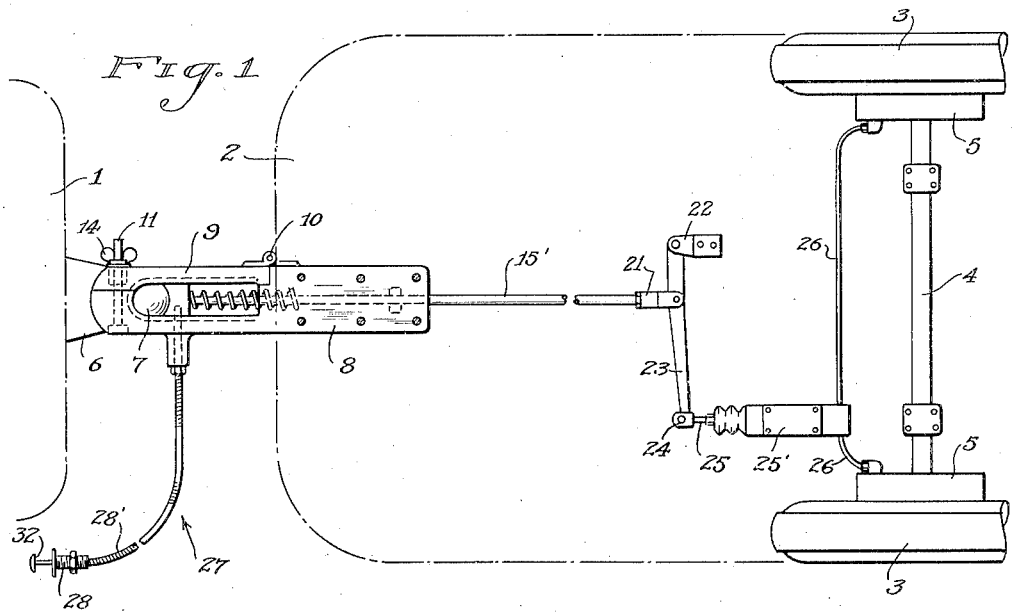
Fig. 1
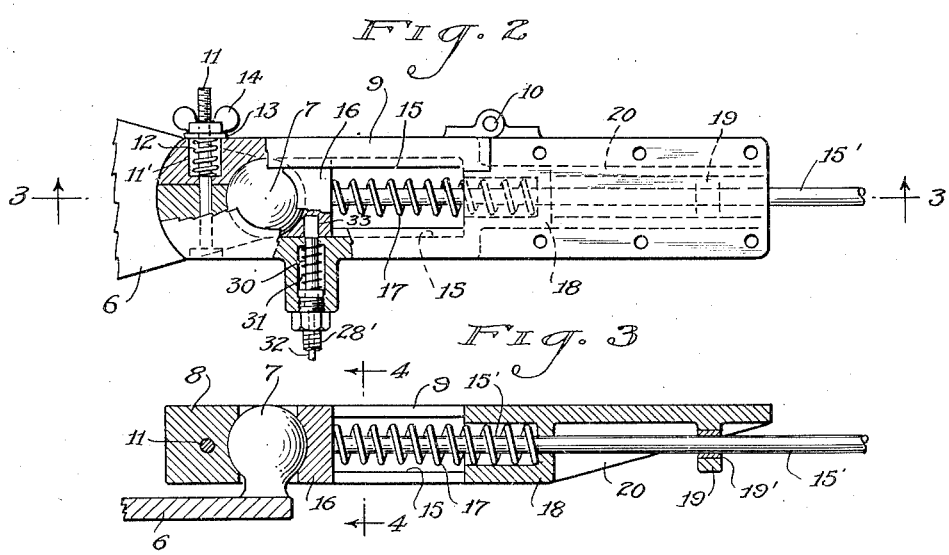
Fig. 2
Fig. 3
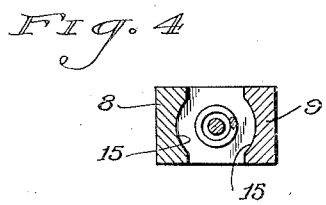
Fig. 4
Jasper L. Salerno
INVENTOR
BY Victor J. Evans & Co.
ATTORNEYS Patented Nov. 1, 1938

2,134,931

UNITED STATES PATENT OFFICE 2,134,931

AUTOMATIC HITCH AND BRAKE MECHANISM

Jasper L. Salerno, East Haven, Conn.

Application April 5, 1937, Serial No. 135,194

5 Claims. (Cl. 188—142)

This invention relates to vehicles, especially of the class which are adapted to be formed into trains of conveyances for use on roads, and its chief object is to provide improved coupling means for connecting together these vehicles into a road train.

A particular object of the invention is to provide a coupling for automotive vehicles which will also act, automatically, as a brake, on occasion.

Another particular object of the invention is to provide an automobile trailer hitch that will automatically brake or slow down the trailer when the automobile stops or slows down, yet which will permit reversing with the trailer still attached.

A further particular object of the invention is to provide an automatic-braking trailer hitch of this improved nature which can nonetheless be easily applied to connect the vehicles and easily removed, will consist of relatively few parts easily and cheaply manufacturable on the quantity scale of production, yet which will be effective, rugged and durable.

The other objects, advantages and uses of the invention will be made more manifest as this specification proceeds.

The presently preferred embodiment of the inventive concepts is shown in the accompanying drawing, and described in the following matter, by way of exemplification only, and it is to be understood that the invention is embodiable in any form within the scope of the sub-joined claims.

In the drawing:

Fig. 1 is a bottom plan view of a puller-vehicle and a pulled-vehicle, coupled by the device of the present invention, the vehicles being shown in phantom except for the wheels and axle of the pulled-vehicle;

Fig. 2 is an enlarged detailed view of the main components of the coupling, shown partly in elevation and partly in section;

Fig. 3 is a vertical longitudinal section on line 3—3 of Fig. 2, sighting in the direction of the arrows, and Fig. 4 is a vertical transverse section on line 4—4 of Fig. 3, sighting in the direction of the arrows.

The structure shown in the drawing comprises essentially a puller-vehicle 1 and a pulled-vehicle 2, the latter vehicle having road wheels 3 mounted on an axle 4, each of the wheels having power-brakes thereon, as shown. The coupling itself comprises essentially a member 6 affixed to the rear end of the puller vehicle, hereinafter referred to as an automobile, the member 6 comprising in the form here shown, a flat plate of rigid material bearing a rounded protuberance 7 on its underside at the end thereof. A shell 8 is attached to the forward portion of the underside of the pulled-vehicle, hereinafter referred to as a trailer. The shell is largely hollow and has one side 9 openable on a hinge 10 at one end thereof, the other end of this side 9 being securable to the main body of the shell by means of a bolt and nut group, shown as comprising a bolt 11 affixed to the standing part of the shell, a spring socket 11' in the movable part of the shell, a helical spring 12 mounted in the socket, and a wing nut 14 acting against a spring urged washer 13.

The shell has formed therein, ways or guide slots 15, for the movement of the member 7 and its cooperants therein, one of said cooperants comprising a plunger 15' having a plunger head 16 thereon, the head fitting in the guides 15. The forward face of the plunger head is concave, as shown, and is adapted to bear continuously against the protuberance 7, even when the vehicles are reversing their direction of movement. The plunger 15' is spring controlled by means of a helical spring 17 mounted in the shell around the plunger. The forward end of the spring 17 bears against the plunger head, and the rear end finds an abutment against the members 18 on the shell. The shell also is formed with a bushing seat 19 for the plunger in which there is a bronze bushing 19', in this embodiment. The shell also bears downwardly-depending webs 20 for strengthening the shell in compression when inertia causes the trailer to approach the automobile suddenly.

The drive rod or plunger 15' bears, on its distal end, a clevis 21. Adjacent the clevis a fulcrum bearing 22 is attached to the underside of the trailer, and constitutes the pivotal point for a link 23 connected by clevis 24 to the plunger 25 of a hydraulic brake cylinder 25'. The hydraulic brake cylinder 25' is connected by means of the usual pipes 26 to the hydraulic brakes on the wheels.

It is contemplated by the present invention to permit backing or reversing the direction of movement of the train of vehicles without disconnecting the coupling or performing any other auxiliary changes. To this end, the coupling is provided with a reversing lock, generally indicated by the numeral 27, this component of the invention having a control member 28 mounted on the dash board of the automobile and including a flexible Bowden cable 28' having a plunger 32 movable therein to operate a spring-controlled lock pin 30 engageable and disengageable with a recess 33 in the plunger head, the spring being a helical one, 31.

Assuming the road-train to be moving along the road at a uniform rate of speed in a uniform direction, the automobile pulling the trailer, the member 7, due to the lag and inertia of the trailer, which acts backwardly, is pulled forward into the extreme forwardmost portion of the shell, with the plunger head 16 closely contacting same and with the lock pin 30 disengaged from the recess 33, there being no reason for reversing at this particular instant. However, if the brakes are applied to the automobile, either gradually or suddenly, the relative velocity of the two vehicles will change, the inertia of the trailer vehicle tending to force the rigid shell onward against the automobile. When this occurs, the member 7 begins to urge the member 16 and plunger 15' rearwardly, towards the end of the trailer, whereby the link 23 is caused to actuate the plunger 25 and to begin to thereby gradually apply the power brakes on the trailer wheels. If the automobile is suddenly stopped, the action just described will take place with a consequent more sudden application of the braking means on the trailer. That is to say, the brakes of the trailer will only be actuated as long as the automobile goes slower than the trailer or as long as there is backward pressure against the plunger rod.

When it is desired to reverse the road-train, the Bowden cable member 32 is actuated to force the pin 30 into the aperture 33, whereupon the plunger head 16 is prevented from being forced to the rear by the rearward urge of the member 7. Thus, the hydraulic or other braking mechanism on the trailer will not be actuated.

If desired, instead of the hydraulic or power brake mechanism shown on the trailer, the plunger 25 may be used to actuate, by means of suitable intermediaries, the pull cables of an ordinary mechanical brake. Other modifications within the spirit of the statement of invention and within the scope of the sub-joined claims, are contemplated as embodiable in the present invention.

I claim:

1. A brake operating mechanism for trailers comprising, a member extending from a pulling vehicle, a ball like member carried thereby, a shell like member attached to the trailer, said shell like member comprising a guide-way for the ball member, a plunger head fitted within said shell like member, spring actuated plunger means associated with said head, said plunger being adapted to actuate the brakes on the trailer, and pivoted means on said shell for permitting attachment of said ball like member.

2. A brake operating mechanism for trailers comprising, a member extending from a pulling vehicle, a ball like member carried thereby, a shell like member attached to the trailer, said shell like member comprising a guide-way for the ball member, a plunger head fitted within said shell like member, said plunger head being concaved for association with the contour of the ball like member, spring actuated plunger means associated with said head, said plunger being adapted to actuate the brakes on the trailer, and pivoted means on said shell for permitting attachment of said ball like member.

3. A brake operating mechanism for trailers comprising, a member extending from a pulling vehicle, a ball like member carried thereby, a shell like member attached to the trailer, said shell like member comprising a guide-way for the ball member, a plunger head fitted within said shell like member, said plunger head being concaved for association with the contour of the ball like member, spring actuated plunger means associated with said head, said plunger being adapted to actuate the brakes on the trailer, pivoted means on said shell for permitting attachment of said ball like member, and means for locking said pivoted means in closed position.

4. A brake operating mechanism for trailers comprising, a member extending from a pulling vehicle, a ball like member carried thereby, a shell like member attached to the trailer, said shell like member comprising a guide-way for the ball member, a plunger head fitted within said shell like member, said plunger head being concaved for association with the contour of the ball like member, spring actuated plunger means associated with said head, said plunger being adapted to actuate the brakes on the trailer, pivoted means on said shell for permitting attachment of said ball like member, means for locking said pivoted means in closed position, and means for holding the plunger head stationary when reversing the direction of travel of the vehicle, said means including a projection integral with and extending at right angles to said shell like member and a pin movable in said projection and adapted to be received in a slot in said plunger head.

5. A brake operating mechanism for trailers comprising, a member extending from a pulling vehicle, a ball like member carried thereby, a shell like member attached to the trailer, said shell like member comprising a guide-way for the ball like member, pivoted means on said shell like member for permitting attachment of said ball, a plunger head fitted within said shell like member, spring actuated plunger means associated with said head, said plunger being adapted to actuate the brakes on the trailer, and means for holding the plunger head stationary when reversing the direction of travel of the vehicle.

JASPER L. SALERNO.